(12) United States Patent
Bowman et al.

(10) Patent No.: US 11,204,785 B1
(45) Date of Patent: *Dec. 21, 2021

(54) PARAMETERIZED USER INTERFACE FOR CAPTURING USER FEEDBACK

(71) Applicant: Ignition Interfaces, Inc., Jacksonville Beach, FL (US)

(72) Inventors: David Bowman, Ponte Vedra Beach, FL (US); Matthias Bowman, Scarsdale, NY (US); Derek Sasaki-Scanlon, Monroe, CT (US)

(73) Assignee: Ignition Interfaces, Inc., Jacksonville Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/032,794

(22) Filed: Sep. 25, 2020

Related U.S. Application Data

(63) Continuation of application No. 16/536,721, filed on Aug. 9, 2019, now Pat. No. 10,802,842, which is a continuation of application No. 15/700,705, filed on Sep. 11, 2017, now Pat. No. 10,430,211.

(60) Provisional application No. 62/495,610, filed on Sep. 12, 2016.

(51) Int. Cl.
| | |
|---|---|
| *G06F 8/38* | (2018.01) |
| *G06F 9/451* | (2018.01) |
| *G06F 16/242* | (2019.01) |
| *G06F 3/0483* | (2013.01) |
| *G06F 3/0482* | (2013.01) |

(52) U.S. Cl.
CPC ............... *G06F 9/451* (2018.02); *G06F 8/38* (2013.01); *G06F 16/2423* (2019.01); *G06F 3/0482* (2013.01); *G06F 3/0483* (2013.01)

(58) Field of Classification Search
CPC .......................................................... G06F 8/38
USPC ........................................................ 715/744
See application file for complete search history.

(56) References Cited

U.S. PATENT DOCUMENTS

| | | | | |
|---|---|---|---|---|
| 5,537,618 | A * | 7/1996 | Boulton | G09B 5/065 434/118 |
| 6,850,252 | B1 * | 2/2005 | Hoffberg | G06K 9/00369 348/E7.061 |
| 6,850,255 | B2 * | 2/2005 | Muschetto | G06F 3/0481 715/744 |
| 7,206,756 | B1 * | 4/2007 | Walsky | G06Q 20/201 705/26.5 |
| 7,330,829 | B1 * | 2/2008 | Tenorio | G06Q 30/00 705/26.62 |

(Continued)

FOREIGN PATENT DOCUMENTS

| | | |
|---|---|---|
| WO | WO 2008/104924 | 9/2008 |
| WO | WO 2013/116816 | 8/2013 |

*Primary Examiner* — Reza Nabi
(74) *Attorney, Agent, or Firm* — Sterne, Kessler, Goldstein & Fox P.L L.C.

(57) ABSTRACT

Disclosed herein are embodiments for processing a user interface (UI) using one or more parameters to capture user feedback. Embodiments operate by identifying one or more UI element codes in an information screen based on a parameter data structure. The embodiments request a set of responses from a database based on the parameter data structure. The embodiments generate a set of UI elements that capture user feedback based on the set of responses. The embodiments then present the information screen with the generated set of UI elements to capture user feedback.

20 Claims, 11 Drawing Sheets

(56) References Cited

U.S. PATENT DOCUMENTS

| | | | |
|---|---|---|---|
| 7,941,751 B2* | 5/2011 | Ebert | G06Q 30/02 715/730 |
| 8,046,804 B2* | 10/2011 | Kelts | H04N 21/4314 725/61 |
| 8,219,925 B2* | 7/2012 | Othmer | H04W 4/02 715/774 |
| 8,271,878 B2* | 9/2012 | Kane | G06Q 30/02 715/733 |
| 8,484,241 B2* | 7/2013 | Bouse | H04L 67/306 707/769 |
| 8,775,332 B1* | 7/2014 | Morris | G06N 5/02 706/11 |
| 8,984,412 B2* | 3/2015 | Lim | G06Q 30/02 715/744 |
| 8,984,415 B2* | 3/2015 | Rose | G06F 3/0484 715/744 |
| 9,092,797 B2* | 7/2015 | Perez | G06Q 10/067 |
| 9,104,287 B2* | 8/2015 | Balchandran | G06F 3/048 |
| 9,237,138 B2* | 1/2016 | Bosworth | H04N 21/25866 |
| 9,310,974 B1* | 4/2016 | Narayanan | G06F 3/0484 |
| 9,335,885 B1* | 5/2016 | Brocato | H04L 41/22 |
| 10,346,900 B1* | 7/2019 | Wilson | G06F 8/38 |
| 10,430,211 B2 | 10/2019 | Bowman et al. | |
| 10,599,738 B1* | 3/2020 | Bayliss-McCulloch | G06F 3/0481 |
| 10,705,859 B2* | 7/2020 | Paratey | G06F 8/38 |
| 2002/0065813 A1* | 5/2002 | Scanlon | G06F 16/54 |
| 2002/0128908 A1* | 9/2002 | Levin | G06Q 30/02 705/14.53 |
| 2007/0192166 A1* | 8/2007 | Van Luchene | G06F 16/3325 705/14.54 |
| 2008/0097830 A1* | 4/2008 | Kim | G06Q 30/02 705/14.4 |
| 2008/0163069 A1* | 7/2008 | Eilers | G06F 40/106 715/744 |
| 2008/0250122 A1* | 10/2008 | Zsigmond | H04L 67/04 709/220 |
| 2008/0270101 A1* | 10/2008 | Salmela | G06F 8/10 703/17 |
| 2008/0306886 A1* | 12/2008 | Otto | G06Q 10/087 706/11 |
| 2009/0018912 A1* | 1/2009 | Altberg | G06Q 30/0273 705/14.56 |
| 2009/0164341 A1* | 6/2009 | Sunvold | G06Q 30/0203 705/26.1 |
| 2009/0171754 A1* | 7/2009 | Kane | G06Q 30/0255 705/14.53 |
| 2009/0199133 A1* | 8/2009 | Deutsch | G06F 16/00 715/811 |
| 2009/0271735 A1* | 10/2009 | Anderson | G06F 9/451 715/815 |
| 2012/0089933 A1* | 4/2012 | Garand | G06F 8/38 715/765 |
| 2013/0311875 A1* | 11/2013 | Pappas | G06F 40/143 715/234 |
| 2013/0339870 A1* | 12/2013 | Tandra Sishtla | G06F 9/454 715/744 |
| 2014/0351085 A1* | 11/2014 | Kotas | G06F 8/38 705/26.8 |
| 2015/0170149 A1* | 6/2015 | Sharma | G06Q 20/027 705/44 |
| 2016/0239904 A1* | 8/2016 | Washington | G06Q 30/0635 |
| 2017/0068991 A1* | 3/2017 | Lim | G06Q 30/0267 |
| 2017/0083886 A1* | 3/2017 | Silva | G07F 9/026 |
| 2017/0091844 A1* | 3/2017 | Yarvis | G06Q 30/0631 |
| 2017/0220943 A1* | 8/2017 | Duncan | G06F 8/38 |
| 2018/0024819 A1* | 1/2018 | Hwang | G06F 8/34 715/763 |
| 2018/0074831 A1* | 3/2018 | Bowman | G06F 9/451 |
| 2018/0203571 A1* | 7/2018 | Dayanandan | G06T 7/73 |
| 2018/0239616 A1* | 8/2018 | Moattar-Aliabadi | G06F 9/54 |
| 2018/0253792 A1* | 9/2018 | Conway | G06Q 40/02 |
| 2020/0034124 A1* | 1/2020 | Rahmathali | G06F 8/38 |
| 2020/0117336 A1* | 4/2020 | Mani | G06F 16/904 |
| 2020/0183988 A1* | 6/2020 | Vasthimal | G06F 11/3452 |
| 2020/0320365 A1* | 10/2020 | Arat | G06N 20/00 |
| 2021/0049548 A1* | 2/2021 | Grisz | G06Q 10/10 |
| 2021/0049674 A1* | 2/2021 | Periyathambi | G06N 20/00 |
| 2021/0150127 A1* | 5/2021 | McCulloh | G06F 3/0481 |

* cited by examiner

Responses 300

| ID 302 | Category 304 | Response Object 306 |
|---|---|---|
| 2 | General | Too expensive |
| 2 | General | Changed mind |
| 2 | General | Better price elsewhere |
| 2 | General | Will not arrive in time |
| 1 | General | Good customer service |
| 1 | General | Good return policy |
| 1 | Preferred | Receive reward points |

FIG. 3A

| Responses 320 | | |
| --- | --- | --- |
| ID 322 | Response 324 | Widget Tag ID 326 |
| 1 | Wrong Item | 1 |
| 2 | Just Browsing | 1 |
| 3 | Inadvertent Click | 1 |
| 4 | Wrong Color | 2 |
| 5 | Wrong Size | 2 |
| 6 | Wrong Brand | 2 |

| Widget Tags 328 | |
| --- | --- |
| ID 330 | Widget Tag 332 |
| 1 | backLink |
| 2 | backLinkClothing |

FIG. 3B

UI Markup 400

```
<form action="order_form.php" method="get">
Product: <input type="text" name="product"><br>
Quantity: <input type="number" name="quantity"><br>
<button id="1" type="submit" formaction="order_form.php">Place Order</button>
<button id="2" type="button">Cancel Order</button><br>
</form>
```

FIG. 4

PARAMETERIZED USER INTERFACE FOR CAPTURING USER FEEDBACK

CROSS-REFERENCE TO RELATED APPLICATION

The present application is a continuation of U.S. patent application Ser. No. 16/536,721, filed Aug. 9, 2019, now allowed, which is a continuation of U.S. patent application Ser. No. 15/700,705, filed Sep. 11, 2017, now U.S. Pat. No. 10,430,211, which claims the benefit of provisional U.S. Patent Application No. 62/495,610, titled "A Parameterized User Interface For Capturing User Feedback" filed on Sep. 12, 2016, all of which are incorporated herein by reference in their entirety.

OVERVIEW

Entities (e.g., businesses, organizations, charities, government entities, or persons providing content) often want to capture user feedback. For example, an entity may want to know why a user purchased a product, became a member, or made a donation.

Entities often capture user feedback through websites and software applications. For example, a business may request user feedback on its website after a user purchases a product. A bank may request user feedback at an automated teller machine (ATM) after a user completes a transaction. An airline may request user feedback at a kiosk before a user checks into a flight.

But such websites and software applications do not capture user feedback associated with a particular action at the time the user actually performs the action. More specifically, such websites and software application do not capture user feedback through a relevant user interface (UI) element at a relevant time. For example, an entity does not capture user feedback when a user actually clicks a submit order button. Because such websites or software applications do not capture user feedback associated with a particular action at the time of performance, a user may decide to skip providing feedback entirely. For example, a user may ignore a request to provide feedback after making a purchase.

In addition, because such websites or software applications do not capture user feedback associated with a particular action at the time of performance, such websites or software applications cannot ensure that a user provided relevant and accurate feedback related to the particular action. For example, a shopping website may allow a user to provide feedback after they purchased a product. However, because the shopping website requests feedback after the user hits the submit order button, the shopping website cannot guarantee the user is providing feedback about the actual product they purchased. Some systems, for example, de-couple the purchase and feedback mechanisms, such that anyone can submit a product review, even if they did not actually purchase the product or did not purchase it from that website.

Entities therefore need a way to generate a UI of their websites and software applications that captures feedback associated with performing a particular action at the time a user actually performs the action. This may prevent a user from ignoring a request to provide feedback, or from providing irrelevant or inaccurate feedback. But generating a UI to capture different types of user feedback associated with performing a particular action at the time a user actually performs the action, under existing approaches, is cumbersome and labor intensive. This is because an entity is forced to routinely modify the UI code to collect new types of user feedback and remove the collection of irrelevant types of user feedback. This is error prone, labor intensive, and may require a computer programmer.

In addition, because such feedback request mechanisms are directly integrated into the UI code, there is no easy way to enable a third-party entity to add or change the type of feedback captured. This may be problematic because an entity may not know which types of user feedback to capture from its users. Instead, the entity may prefer to delegate feedback collection to a third-party entity. For example, a marketing firm may know better than the entity itself which types of user feedback to capture. Thus, an entity needs a way to enable third-party entities to specify what types of user feedback to capture while preventing the third-party entities from directly modifying the UI code.

Hence, what is needed is a technological solution to the technological problem of how to generate a UI to capture user feedback through a relevant UI element at a relevant time without directly modifying the UI code. Embodiments herein solve this technological problem by parameterizing the UI code of a website or software application. Specifically, embodiments herein generate UI elements (e.g., buttons, checkboxes, or other graphical UI elements) according to parameters associated with UI element codes in the UI code of a software application or website. The generated UI elements perform the same action as a traditional UI element generated from the UI element code without parameterization (e.g., submitting a form, requesting a different webpage, closing the software application, or leaving the website). However, the generated UI elements also capture user feedback when the user interacts with them (e.g., the user likes a product on a website, the user dislikes the checkout process, the user thinks a product is too expensive, or the user is in a certain demographic or other category). The generated UI elements capture user feedback at the same time a user performs a particular action associated with one of the generated UI elements. Thus, embodiments herein enable the capture of user feedback through a relevant user interface (UI) element at a relevant time.

Moreover, because the types of user feedback captured by the generated UI elements can be specified by a third-party entity in a data source outside the UI code of the software application or website, the error prone and labor intensive process of routinely modifying the UI code of a website or software application to collect new types of user feedback can be reduced.

BRIEF DESCRIPTION OF THE DRAWINGS

The accompanying drawings are incorporated herein and form a part of the specification.

FIG. 3A is an example set of responses for a system that processes a UI to capture user feedback based on one or more parameters, according to some embodiments.

FIG. 3B is another example set of responses for a system that processes a UI to capture user feedback based on one or more parameters, according to some embodiments.

FIG. 4 is an example markup for an information screen for an online shopping cart application, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
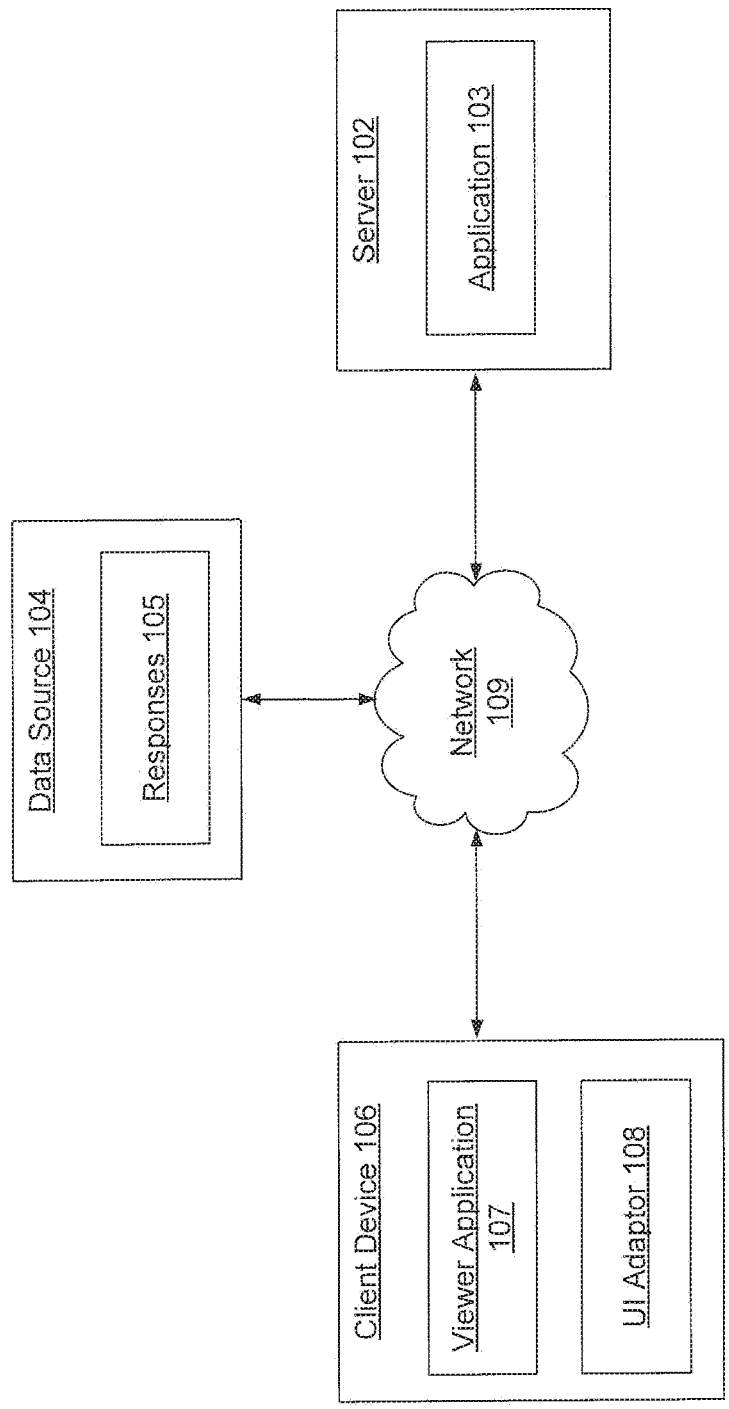
FIG. 1 is a block diagram of a system for processing a user interface (UI) to capture user feedback based on one or more parameters, according to some embodiments.

Provided herein are system, apparatus, device, method and/or computer program product embodiments, and/or combinations and sub-combinations thereof, for processing a user interface (UI) of a website or software application to capture user feedback based on one or more parameters.

Traditionally, a website or software application captures user feedback at a different point in time than when the action associated with the feedback is actually performed. For example, consider the case where a user buys a book from an online shopping website. The user first loads the website in her web browser. The user then searches for a book of interest on the website. Once the user finds a book of interest, she adds the book to her virtual shopping cart. The user then proceeds to the checkout webpage and clicks the submit order button to buy the book.

After purchasing the book, the website may load another webpage asking her to provide feedback about her purchase. For example, the website may want to know why she purchased the book, why she purchased the book online as opposed to in a store, why she choose this particular shopping website, or whether she would recommend the shopping website to her friends. The website may also want to know more general information such as whether she is over forty years old or whether she feels the website is easy to use. Thus, the shopping website requests such feedback after she made the purchase. But she may not be interested in submitting her feedback after she purchased the book, Instead, she may just close the feedback webpage. In this case, the shopping website misses out on a chance to gather valuable user feedback.

Even if the user does provide her feedback through the feedback webpage, the shopping website may not be able to ensure the provided feedback is relevant and accurate. This is because the feedback webpage may not be able to ensure that the type of feedback she provided is related to the book she purchased. For example, the feedback webpage may allow the user to indicate that she purchased the book because she likes nonfiction even though she actually purchased a fiction book.

Instead of capturing such feedback after the user purchased the book, embodiments herein enable the shopping website to capture user feedback directly when the user actually purchases the book by clicking the submit order button. Specifically, the shopping website may specify several textual responses that a user may provide for why the user is purchasing the book. Alternatively, the shopping website may display the several responses using symbols, colors, etc. Each response may be used to generate a custom submit order button, and each submit order button may be generated just prior to the user loading the checkout webpage. For example, one submit order button may be labeled "Submit order because lowest price found" based on the textual response "lowest price found." When the user clicks the button labeled "Submit order because lowest price found", the button will purchase the book and capture the feedback "I purchased this book because it was the lowest price I found." Another submit order button may be labeled "Submit order because receive reward points." When a user clicks the button labeled "Submit order because receive reward points," the button will purchase the book and capture the feedback "I purchased this book because I receive reward points." Another submit order button may be labeled "Submit order. I am over forty years old." When a user clicks the button labeled "Submit order. I am over forty years old," the button will purchase the book and capture the feedback "I purchased this book and I am over forty years old." As a result, the shopping website directly captures user feedback at the time the user actually purchases the book by clicking the submit order button. Moreover, the shopping website captures user feedback through a relevant UI element (e.g., the submit order button). Because the user is required to click the submit order button to purchase the book, the shopping website may receive valuable purchasing feedback.

Embodiments here provide several other benefits. First, because the submit order button may directly capture why the user purchased the book, the shopping website can store the textual response (e.g., user feedback) based on factors directly associated with the clicking of the submit order button, such as what book the user purchased, the time the user purchased the book, how much the book cost, or how many reward points the user had just before she purchased the book. Second, because the textual responses may be specified in a data store, and not in the UI code of the shopping website, the responses can easily be changed by the shopping website to capture new types of user feedback without having to modify the UI code. This reduces webpage development time and software bugs created when modifying webpage source code. It also reduces the need to develop separate feedback webpages and routinely modify webpages to capture new types of user feedback. Finally, because the submit order button both captures user feedback and performs an action, the amount of data obtained per click, per minute, or per visitor is increased. This reduces the number of network requests being performed which saves compute cycles, network bandwidth, and potentially increases the battery life of mobile clients.

Embodiments operate by receiving a request for an information screen (e.g. a webpage) of a website or software application. Embodiments may identify one or more UI element codes (e.g., UI element codes for generating buttons, checkboxes, list boxes, tabs, or arrows) in a UI code of the information screen based on a parameter data structure. However, as would be appreciated by a person of ordinary skill in the art, the UI code need not include a parameter data structure. Embodiments may request a set of responses (e.g., a list of textual feedback related to the task the user is performing) from a data store based on the parameter data structure. Thus, in some embodiments, configuration of the set of responses in the data store may be all that is required. Embodiments may generate a set of UI elements based on the identified set of UI element codes. Some other embodiments may transform the identified set of UI element codes into different UI elements instead of generating a set of UI elements. Embodiments then present the set of UI elements in the information screen to a client in order capture user feedback. Because the UI of the website or software application is generated at the time a user performs a particular task, an entity can capture user feedback through a relevant portion of the UI at a relevant time. In addition, an entity can manage the types of user feedback captured independently of the website or software application. This enables the entity to quickly change the type of user feedback captured, or capture user feedback through a third-party entity. Finally, an entity can capture more tailored types of user feedback as needed.

FIG. 1 is a block diagram of a system 100 for processing a UI of a website or software application to capture user feedback based on one or more parameters, according to some embodiments. System 100 includes a server 102, a data source 104, and a client device 106.

In some embodiments, server 102 communicates with client device 106 operated by a user over a network 109. Network 109 may be any network or combination of networks including the Internet, a local area network (LAN), a wide area network (WAN), a wireless network, a cellular network, or various over types of networks as would be appreciated by a person of ordinary skill in the art.

Client device 106 may be any computing device that can communicate with server 102 including a desktop computer, laptop computer, tablet computer, and smart phone. Client device 106 may include a viewer application 107 to display a UI of an application 103 from server 102. In some other embodiments, client device 106 may include application 103. Application 103 may be any type of software application that presents a UI. For example, application 103 may be a web application.

In some embodiments, viewer application 107 is a software application for retrieving and presenting a UI for application 103. Specifically, viewer application 107 may display one or more information screens representing the UI of application 103. As would be appreciated by a person of ordinary skill in the art, viewer application 107 may output one or more information screens representing the UI of application 103 using various other output forms.

In some embodiments, an information screen may include content for application 103 and one or more UI elements (e.g., buttons, checkboxes, list boxes, or tabs) for interacting with the content. In some embodiments, viewer application 107 may be a web browser such as MICROSOFT INTERNET EXPLORER®, MICROSOFT EDGE®, MOZILLA FIREFOX®, APPLE SAFARI®, and GOOGLE CHROME® web browsers. In some embodiments, an information screen may be a webpage. In some other embodiments, an information screen may be a UI screen for a desktop, laptop, tablet, or smartphone software application. In some other embodiments, an information screen may be a UI screen for a point of sale (POS) terminal, kiosk, or automated teller machine (ATM). In some embodiments, an information screen may include border UI elements (e.g., the chrome) of viewer application 107 such as a close button, a minimize window button, and/or a maximize window button.

In some embodiments, an information screen may include one or more various UI elements. For example, an information screen may include buttons, checkboxes, list boxes, combo boxes, split buttons, and various other types of UI elements as would be appreciated by a person of ordinary skill in the art. A user at client device 106 may interact with the UI elements using a computer mouse, keyboard, touch screen, an input device that operates using natural voice, or various other input devices as would be appreciated by a person of ordinary skill in the art.

In some embodiments, a UI element in an information screen may perform an action. For example, a user may click a button to submit a form. In response, the button may transmit the form to a server.

In some embodiments, performing an action associated with a UI element may generate a new, and possibly, different information screen. For example, when a user clicks a "Place Order" button on a checkout webpage of a shopping website, the website may generate a new information screen that lists the order summary but does not include the "Place Order" button anymore.

Traditionally, performing an action associated with a UI element does not directly capture user feedback. For example, a UI element may not capture why a user performed an action associated with the UI element (e.g., why a user decided to purchase a product by clicking the submit order button). Rather the UI element (e.g., the submit order button) may perform the action and the entity may have to capture feedback about why the user performed the action after the user performs the action. As a result, entities may not capture user feedback through a relevant UI element (e.g., a submit order button) at a relevant time (e.g., checkout on a shopping website).

In some embodiments, UI adaptor 108 solves at least the technological problems of: how to obtain additional data input with a single action request, and how to customize UI elements on an interface without changes to the underlying UI code Typically, when generating a UI of a website or software application, a computer system will read and process the UI code. Each time the system encounters a UI element code in the UI code, e.g., an HTML "<button>" tag, a UI element is generated. The UI element code may be any type of computer instruction in the UI source that generates a UI element, e.g., an operation, function call, tag, etc.

In some embodiments. UI adaptor 108 solves the technological problem of capturing additional data input with a single action request using a parameter data structure. The parameter data structure may be a unique numerical identifier, alphanumerical identifier, or a compound data structure including several fields. The parameter data structure may be added to a UI element code in UI code for the website or software application so that when UI adaptor 108 encounters this type of UI element code, it will read the parameter data structure and execute a function that requests a set of responses from a data store. The set of responses may be provided by an entity (e.g., a business, organization, charity, government entity, or person providing content). UI adaptor 108 may then generate a set of UI elements for the identified UI element code that capture user feedback based on the set of responses. In some other embodiments, instead of generating the set of UI elements, UI adaptor 108 transforms the identified UI element code into one or more different UI elements that capture user feedback based on a set of responses. As would be appreciated by a person of ordinary skill in the art, generating a set of UI elements will be referred herein interchangeably with transforming the identified UI element code. Moreover, as would be appreciated by a person of ordinary skill in the art, UI adaptor 108 may process UI code that is human-readable computer code and UI code that is binary machine code. UI code will refer herein to both human-readable computer code and binary machine code.

In some embodiments, UI adaptor 108 may generate the set of UI elements such that the set of UI elements perform the same action as a traditional UI element generated from the identified UI element code. However, the generated set of UI elements may also capture user feedback. Because UI adaptor 108 may generate the set of UI elements for each information screen request by a client, the UI of the website or software application can be updated during each information screen request to capture different types of user feedback. In some other embodiments, UI adaptor 108 may generate the set of UI elements based on various other factors (e.g., a timer, an interaction with the UI by a user, etc.) instead of a new information screen request.

In some embodiments, client device 106 may include UI adaptor 108 to process the UI code of application 103 to capture user feedback. However, as would be appreciated by a person of ordinary skill in the art, server 102 may also include UI adaptor 108 to process the UI code of application 103 to capture user feedback.

In some embodiments, UI adaptor 108 may generate a set of UI elements from a UI element code in UI code for an information screen for application 103. Specifically, UI adaptor 108 may generate the set of UI elements based on a set of responses stored in data source 104. As would be appreciated by a person of ordinary skill in the art, the set of responses may comprise different types of feedback being requested by an entity. The set of responses may be a set of textual responses (e.g., "I am purchasing this product because it is the lowest price found", "I am purchasing this product because I like the return policy", or "I am purchasing this product because of free shipping") indicating why a user choose to perform the action associated with the UI element (e.g. clicking a submit order button). The set of responses may also be a set of colors or symbols (e.g., an up arrow or down arrow) indicating why a user choose to perform the action associated with the UI element. In some embodiments, a UI element may be a button, combo box, list box, split button, hover link, hyperlink, tab, or various other types of UI elements as would be appreciated by a person of ordinary skill in the art.

In some embodiments, data source 104 may be a database management system (DBMS) such as ORACLE®, MYSQL®, MICROSOFT SQL SERVER®, POSTGRESQL®, and IBM DB2®. In some embodiments, the DBMS maybe a relational database. In some other embodiments, the DBMS may be a NoSQL or non-relational database such as MongoDB®. In some other embodiments, data source 104 may be an array data structure, linked list data structure, table, file such as a plain text file or spreadsheet file, or other repository for storing and managing a collection of data as would be appreciated by a person of ordinary skill in the art. In some embodiments, UI adaptor 108 may connect to data source 104 over network 109 and retrieve the set of customized responses. UI adaptor 108 may then generate UI elements based on the set of responses for an information screen of application 103.

In some embodiments, UI adaptor 108 may connect to data source 104 over network 109 and retrieve the set of responses based on a context variable. In some embodiments, a context variable is a data structure that stores state information (e.g., items added to a shopping cart in an online store) or records user activity (e.g., clicking of particular buttons, logging in, or recording which information screen of application 103 was viewed by a user in the past). In some embodiments, a context variable may store arbitrary pieces of information that a user previously entered into form fields such as names, addresses, passwords, and credit card numbers. In some embodiments, a context variable may be stored on client device 106 (e.g., a cookie for a web browser). In some other embodiments, a context variable may be stored on server 102.

In some embodiments. UI adaptor 108 may retrieve a different set of responses from data store 104 based on information stored in a context variable. Specifically, UI adaptor 108 may retrieve a different set of responses from data store 104 by comparing the information stored in the context variable to the responses, and response metadata, in data store 104. For example, UI adaptor 108 may retrieve a different set of responses for an online shopping website depending on the type of credit card a user used during checkout. In some other embodiments, UI adaptor 108 may retrieve a different set of responses based on what websites a user previously visited or whether the user is logged in. As would be appreciated by a person of ordinary skill in the art. UI adaptor 108 may retrieve a different set of responses based on various other types of information stored in a context variable.

In some embodiments, UI adaptor 108 generates a set of UI elements for each response in the set of responses in data source 104. For example, UI adaptor 108 may generate three buttons for three responses. Specifically, a button labeled "Response 1" may be generated from a response of "Response 1." A button labeled "Response 2" may be generated from a response of "Response 2." Finally, a button labeled "Response 3" may be generated from a response of "Response 3."

In some embodiments, the set of responses in data source 104 may represent entity specific user feedback. Thus, for example, one business may capture a different set of responses than another business.

For example, an online shopping website may capture the following set of responses from data source 104: "Place order because lowest price," "Place order because of return policy," "Place order because receive reward points." UI adaptor 108 may then generate a new set of UI elements from an existing "Place Order" button. Specifically, UI adaptor 108 may generate a "Place order because lowest price" button, a "Place order because of return policy" button, and a "Place order because receive reward points" button. The three buttons may perform the same action as the "Place Order" button, e.g., submitting an order to the website. But the three buttons also capture additional user feedback when clicked. In other words, each of the three buttons capture two pieces of information (e.g., a submit order request and feedback about why a user placed the order) for a single click. This enables the transmission of more information per click, per visitor, or per minute to the website. In addition, the three buttons may reduce additional network requests because it is unnecessary to perform a separate network transmission with captured feedback information (e.g., why the user placed the order after submitting the order network request).

In some embodiments, an agent of an entity may insert, update, or delete responses from the set of responses in data source 104. An agent may modify the set of responses in data source 104 without having to modify the code of application 103. This is because the set of responses may be stored independently of application 103 in data source 104. As a result, the agent does not have to be a computer programmer or have technical expertise. Moreover, the agent may modify the set of responses without introducing programming errors into application 103. This is because the agent can modify the set of responses without having to modify the code of application 103.

In some embodiments, an agent of a marketing firm may insert, update, or delete responses from the set of responses in data source 104. The agent may act on behalf of a business or organization. This enables a business or organization to rely on the expertise of an outside company or organization (e.g., a marketing firm) to determine the type of responses to capture.

In some embodiments, UI adaptor 108 may be disabled from reading the UI code in order to prevent UI adaptor 108 from generating UI elements that capture feedback from identified UI element codes with added parameter data structures. In some other embodiments, UI adaptor 108 may be configured to ignore UI element codes with added parameter data structures. As a result, UI adaptor 108 may not generate any UI elements that capture feedback from identified UI element codes.

In some embodiments. UI adaptor 108 may be partially disabled from generating UI elements that capture feedback from identified UI element codes. Specifically, an entity may choose to not include responses for a particular UI element code in data source 104. UI adaptor 108 may then be configured to skip generating a UI element that captures feedback for the particular UI element code based on the lack of an associated response in data source 104. Instead, UI adaptor 108 may generate a traditional UI element that does not capture feedback. As a result, the traditional UI element may maintain the capability of performing the associated action of the UI element code but not capturing user feedback.

Figure 2:
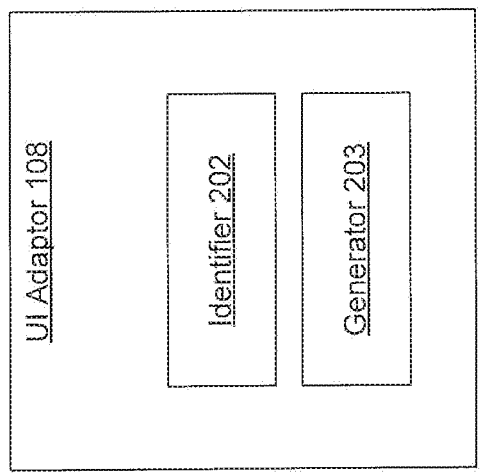
FIG. 2 is a block diagram of a UI adaptor for processing a UI to capture user feedback based on one or more parameters, according to some embodiments.

FIG. 2 is a block diagram of UI adaptor 108 for processing a UI to capture user feedback based on one or more parameters, according to some embodiments. In some embodiments, UI adaptor 108 may be stored on server 102. UI adaptor 108 may be a part of a server program that handles information screen requests from client 106, e.g., web server software. In some other embodiments, UI adaptor 108 may a separate program that interacts with the server program that handles information screen requests from client 106. In some embodiments, UI adaptor 108 may be executed to process UI code for an information screen in response to the server program receiving a request for the information screen from client 106. UI adaptor 108 may then generate a set of UI elements that capture feedback for the information screen. UI adaptor 108 may then transmit the generated set of UI elements to the server program for delivery to client 106.

In some embodiments. UI adaptor 108 may be stored on client 106. UI adaptor 108 may be a separate program (e.g., a software plugin or extension) that interacts with viewer application 107 to present a generated set of UI elements that capture feedback. In some other embodiments, UI adaptor 108 may be a part of viewer application 107. In some embodiments, UI adaptor 108 may be executed in response to viewer application 107 receiving UI code for an information screen from server 102. UI adaptor 108 may then generate a set of UI elements that capture feedback for the information screen. UI adaptor 108 may then provide the generated set of UI elements to viewer application 107 for presentation.

In some embodiments, where UI adaptor 108 is a separate program, viewer application 107 may prompt a user at client device 106 to download and install UI adaptor 108 in response to receiving the UI code. Viewer application 107 may prompt the user based on metadata in the UI code which indicates that the UI code is to be processed by UI adaptor 108. As would be appreciated by a person of ordinary skill in the art, the viewer application 107 may prompt the user using various other mechanisms.

In some embodiments, UI adaptor 108 may be implemented in PHP: Hypertext Preprocessor (PHP), Java, Python, JavaScript, Visual Basic, or various other types of programming languages as would be appreciated by a person of ordinary skill in the art. In some embodiments, UI adaptor 108 may be a software plugin or extension for viewer application 107. For example, UI adaptor 108 may be a browser extension for MICROSOFT INTERNET EXPLORER®, MICROSOFT EDGE®, MOZILLA FIREFOX®, APPLE SAFARIS, or GOOGLE CHROME® web browsers.

In some embodiments, UI adaptor 108 may include identifier 202 and generator 203. Identifier 202 may identify one or more UI element codes in a UI code for an information screen of application 103 from which to generate UI elements that capture feedback. Specifically, identifier 202 may search the UI code for a parameter data structure linked to a UI element code. For example, identifier 202 may identify a UI element code by searching for a parameter data structure linked to a UI element code in a hypertext markup language (HTML) file describing a web page for application 103. As would be appreciated by a person of ordinary skill in the art, identifier 202 may identify a UI element code from which to generate a set of UI elements that capture feedback using various other mechanisms.

In some embodiments, a parameter data structure may be a unique numerical identifier. In some other embodiments, a parameter data structure may be a compound data structure including several fields. For example, the parameter data structure may include a numerical identifier field and a UI element type field. As would be appreciated by a person of ordinary skill in the art, a parameter data structure may include various other fields.

In some embodiments, the numerical identifier field may be a unique numerical identifier linked to a UI element code. The UI element type field may indicate a type of UI element to generate. For example, in some embodiments, the UI element type field may be set to "button" to generate a set of button UI elements. In some other embodiments, the UI element type field may be set to "combo box" to generate one or more combo box UI elements. As would be appreciated by a person of ordinary skill in the art, the UI element type field may be set to various other values to generate various other types of UI elements.

In some embodiments, an agent may link a parameter data structure to a UI element code by modifying the UI code (e.g., a markup file) that presents an information screen for application 103. For example, an agent may link a parameter data structure to a UI element code by modifying a hypertext markup language (HTML) document describing a web page for application 103. As would be appreciated by a person of ordinary skill in the art, an agent may link a parameter data structure to a UI element in an information screen for application 103 using various other mechanisms.

In some embodiments, an agent may specify a parameter data structure using a reserved attribute field linked to the UI element code. For example, the UI element code may be a HTML button tag and the parameter data structure may be a "name" attribute field. The "name" attribute field may be a reserved attribute field in the HTML standard. The UI element code may be linked to the parameter data structure using the following format: <button name="ui-capture" type="button">Click Me!</button>. By using a reserved attribute field, viewer application 107 may be able to still present an information screen (without generated UI elements that capture feedback) when UI adaptor 103 is not installed on, or being used by, a client device. Viewer application 107 may simply ignore the "name" attribute field. This may ensure backward compatibility with client devices that do not have UI adaptor 103 installed. On the other hand, if UI adaptor 103 is installed and being used by a client device, UI adaptor 103 may generate a set of UI elements that capture feedback based on the "name" attribute field (e.g., the parameter data structure) being set to "ui-capture."

In some other embodiments, an agent may specify a parameter data structure using a new attribute field linked to the UI element code. For example, the UI element code may be a HTML button tag and the parameter data structure may be a HTML data attribute such as "data-ui-capture." The UI element code may be linked to the parameter data structure using the following format: <button data-ui-capture="1" type="button">Click Me!</button>. An agent may find a HTML data attribute to be more flexible than a reserved HTML attribute because the HTML data attribute may have no usage rules or value restrictions. Moreover, if UI adaptor 103 is installed and executing on server 102, a HTML data attribute can be used to generate UI elements that capture feedback while preserving backward compatibility at different client devices. This is because UI adaptor 103 may generate the UI elements that capture feedback at server 102 before they are received at client device 106.

In some embodiments, identifier 202 may present the identified set of UI element codes to generator 203. Generator 203 may then generate a set of UI elements for the identified UI element codes in an information screen for application 103.

In some embodiments, generator 203 may generate the set of UI elements based on a set of responses stored in data store 104. Specifically, generator 203 may request a set of responses from data store 104 over network 109. In some embodiments, generator 203 may request the set of responses from data store 104 based on the parameter data structure linked to the identified UI element code. However, as would be appreciated by a person of ordinary skill in the art, generator 203 may request the set of responses from data store 104 based on various other mechanisms.

In some embodiments, generator 203 may generate a UI element for each response in the set of responses associated with the identified UI element code. Generator 203 may generate a UI element such that the UI element performs the same action as the identified UI element code normally would perform but also captures a response associated with the generated UI element.

For example, generator 203 may generate UI elements A, B, and C for a UI element code <button name="Z">Z</button>. Generator 203 may configure UI elements A, B, and C to perform the same action as a traditional UI element generated from UI element code <button name="Z">Z</button> would perform, e.g., executing a script named script.php at server 102.

In some embodiments, generator 203 may also configure UI elements A, B, and C to capture their associated responses from data store 104. For example, UI element A may be associated with the response "Red." UI element B may be associated with the response "Green." UI element C may be associated with the response "Blue." Generator 203 may configure UI element A to execute script.php and capture the response "Red" when a user performs the action associated with UI element A. Similarly, generator 203 may configure UI element B to execute script.php and capture the response "green." Finally, generator 203 may configure UI element C to execute script.php and capture the response "blue."

In some embodiments, generator 203 may configure a UI element to perform an action and capture a response using a Hypertext Transfer Protocol (HTTP) GET request. For example, generator 203 may configure UI element A to execute script.php and capture the response "Red" by issuing the GET request scrip.php?response=Red to server 102. As would be appreciated by a person of ordinary skill in the art, generator 203 may configure a UI element to capture a response using various other mechanisms (e.g., an HTTP POST request, JavaScript, Java, and PHP). A captured response may be stored in server 102 or data store 104.

In some embodiments, a set of responses in data source 104 may be stored in a database table. A response in the set of responses may be assigned an identifier that corresponds to a parameter data structure linked to a UI element in an information screen of application 103. In some embodiments, a response in the set of responses may also be assigned a category that indicates a type of response.

FIG. 3A shows an example set of responses 300 for a system that processes UI code to capture user feedback based on one or more parameters, according to some embodiments. For example, the set of responses 300 may be for an online shopping cart application. In some embodiments, an agent of a business, organization, or government entity may insert, modify, or delete one or more responses from the set of responses 300.

In the example of FIG. 3A, responses 300 is a table with the following columns: ID 302, category 304, and response object 306. However, responses 300 may implemented using various other columns and data structures as would be appreciated by a person of ordinary skill in the art.

In the example of FIG. 3A, a response in the set of responses is represented as a row in responses table 300. A response in response table 300 contains three pieces of information: an ID 302, a category 304, and a response object 306. ID 302 may store a unique numerical identifier associated with a parameter data structure linked to a UI element in an information screen for application 103. Category 304 may store a type of response for a UI element. For example, in FIG. 3A, there are two categories of response: "General" and "Preferred." The "General" category may represent responses for normal customers and the "Preferred" category may represent responses for preferred customers. Finally, response object 306 may store the actual response to be used to generate a UI element in the set of UI elements. Response object 306 may be a text string, a color, an image, a sound, a video, or various other types of responses as would be appreciated by a person of ordinary skill in the art.

FIG. 3B shows another example set of responses 320 for a system that processes UI code to capture user feedback based on one or more parameter data structures, according to some embodiments. In the example of FIG. 3B, responses 320 is a table with the following columns: ID 322, response 324, and widget tag ID 326. However, responses 320 may implemented using various other columns and data structures as would be appreciated by a person of ordinary skill in the art.

In the example of FIG. 3B, a response in the set of responses is represented as a row in responses 320. A response in responses 320 has a unique ID (e.g., ID 322) and a response content (e.g., response 324). Response 324 may be a text string, a color, an image, a sound, a video, or various other types of response content as would be appreciated by a person of ordinary skill in the art.

In the example of FIG. 3B, a response in responses 320 is also associated with a widget tag 332 in the table widget tags 328. A widget tag 332 may represent a category or class of responses such that any UI element associated with a given widget tag 332 may be modified (or decorated) with an identical set of responses from responses 320.

In the example of FIG. 3B, a response in responses 320 is associated with widget tag 332 via widget tag ID 326 (e.g., a foreign key reference). In other words, a widget tag ID 326 contains a reference to a ID 330 in widget tags 328. A ID 330 in widget tags 328 is a numerical identifier that uniquely identifies a widget tag 332 in widget tags 328. A widget tag 332 may be a text string, a color, an image, a sound, a video, or various other types of response content as would be appreciated by a person of ordinary skill in the art.

In some embodiments, with respect to the example of FIG. 3B, a UI element in an information screen (e.g., an HTML element) may be associated with one or more parameter data structures that reference responses 320 and widget tags 328. For example, an HTML element may contain the following HTML 5 data attributes: data-ii-widgetTag and data-ii-widgetID, data-ii-widgetTag may contain a value of a widget tag 332 in widget tags 328 (e.g., "backLinkClothing"). An HTML element may be modified (or decorated) with a set of responses 324 in responses 320 based a value of its data-ii-widgetTag attribute. For example, an HTML element may decorated with the responses 324 of "wrong color", "wrong size", and "wrong brand" when its data-ii-widgetTag attribute is set to "backLinkClothing".

In some embodiments, multiple UI elements (e.g., HTML elements) may have the same parameter data structure value (e.g., the same value for their data-ii-widgetTag attributes). These UI elements (e.g., HTML elements) will therefore be decorated with the same set of responses 324 in responses 320.

In some embodiments, the data-ii-widgetID data attribute of an HTML element may uniquely identify the HTML element. As a result, when a response 324 is recorded for an HTML element, the value of data-ii-widgetID data attribute can be used to determine the exact HTML element that captured the response 324.

In some embodiments, a combination of the data-ii-widgetID and data-ii-widgetTag attributes may be used to decorate an HTML element with a set of responses 324. For example, in some embodiments, the data-ii-widgetID and data-ii-widgetTag attributes may each define a set of responses 324 for an HTML element. In some embodiments, a set of responses 324 for the HTML element may be determined by taking the intersection of the set of responses 324 associated with its data-ii-widgetID data attribute and the set of responses 324 associated with its data-ii-widgetTag data attribute. In some other embodiments, a set of responses 324 for the HTML element may be determined by taking the union of the set of responses 324 associated with its data-ii-widgetID data attribute and the set of responses 324 associated with its data-ii-widgetTag data attribute.

As would be appreciated by a person of ordinary skill in the art, various other combinations of the data-ii-widgetID and data-ii-widgetTag attributes may be used to decorate an HTML element with a set of responses 324. Moreover, as would be appreciated by a person of ordinary skill in the art, various numbers, types, and names of parameter data structures (e.g., HTML 5 data attributes) for various types of UI elements may be used alone or in combination to determine a set of responses.

In some embodiments, generator 203 may generate a set of UI elements by looking up a parameter data structure linked to a UI element code in the set of responses. In some other embodiments, generator 203 may look up a parameter data structure linked to a UI element code and a category in the set of responses. The operation of generator 203 is described with reference to FIGS. 3A-6.

FIG. 4 shows a portion of an example UI markup 400 for an information screen for application 103. In FIG. 4, example UI markup 400 is for an online shopping cart application and may be an HTML file. As would be appreciated by a person of ordinary skill, UI markup 400 may represent the information screen using PHP, JavaScript, Java or various other programming languages.

Figure 5:
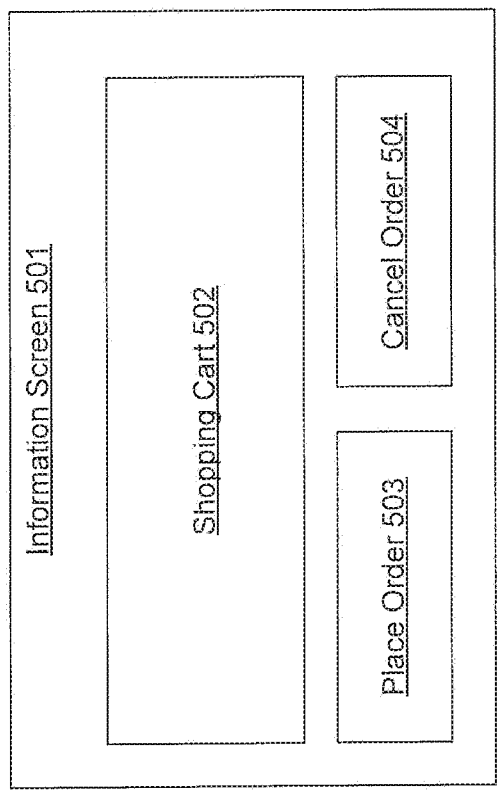
FIG. 5 is an example display of the information screen for an online shopping cart application without processing to capture user feedback based on one or more parameters, according to some embodiments.

FIG. 5 is an example display of the information screen for the online shopping cart application represented by UI markup 400 without processing to capture user feedback based on one or more parameters, according to some embodiments. In FIG. 5, viewer application 107 may display UI markup 400 as information screen 501 without processing by generator 203. In some embodiments, information screen 501 may be a web page. In some other embodiments, information screen 501 may a UI screen for a desktop, laptop, tablet, or smartphone software application. In some other embodiments, information screen 501 may a UI screen for a POS terminal.

In some embodiments, information screen 501 may include a shopping cart 502, a place order button 503, and a cancel order button 504. Shopping cart 502 may be a UI pane that displays a list of items in the online shopping cart. Place order button 503 may be a UI button that submits an order for the items in shopping cart 502. Cancel order button 504 may be a UI button that deletes the items in shopping cart 502 and cancels a prospective order. While FIG. 5 is used to show what the information screen 501 would look like if no customization were used, typically FIG. 5 would not be displayed if customized UI elements were available. Instead, an information screen such as that in FIG. 6 would be displayed.

Figure 6:
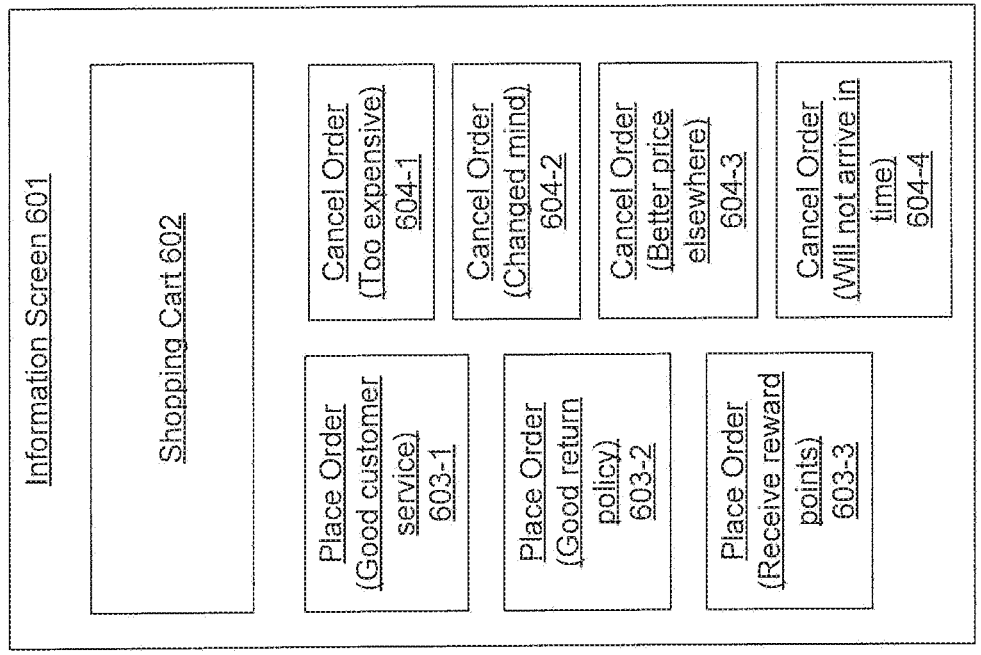
FIG. 6 is an example display of the information screen for an online shopping cart application with processing to capture user feedback based on one or more parameters, according to some embodiments.

FIG. 6 is an example display of the information screen for the online shopping cart application represented by UI markup 400 after processing to capture user feedback based on one or more parameters, according to some embodiments. In FIG. 6, viewer application 107 may display UI markup 400 as information screen 601 after processing by generator 203. Information screen 601 may be a web page similar to information screen 501. In some other embodiments, information screen 701 may a UI screen for a desktop, laptop, tablet, or smartphone software application. In some other embodiments, information screen 501 may a UI screen for a POS terminal.

In some embodiments, information screen 601 may include a shopping cart 602. Shopping cart 602 may be a UI pane that displays a list of items in the online shopping cart similar to shopping cart 502. Information screen 601 may also include a new set of UI elements 603 and 604.

In some embodiments, generator 203 may generate UI elements 603 and 604 based on responses 300. Specifically, identifier 202 may identify a parameter data structure (e.g., "id=1") linked to the UI element code that generates Place Order button 503 in UI markup 400 for information screen 501. Similarly, identifier 202 may identify a parameter data structure (e.g., "id=2") linked to the UI element code that generates Cancel Order button 504 in UI markup 400 for information screen 501.

In some embodiments, generator 203 may look up the parameter data structure (e.g., "id=1") linked to the UI element code that generates Place Order button 503 in responses 300. Similarly, generator 203 may lookup the parameter data structure (e.g., "id=2") linked to the UI element code that generates Cancel Order button 504 in responses 300.

In some embodiments, generator 203 may retrieve a set of responses associated with the UI element code that generates Place Order button 503 from responses 300. For example, generator 203 may receive the following responses associated with the parameter data structure (e.g., "id=1") linked to the UI element code that generates Place Order button 503 from data source 104: "Good customer service" and "Good return policy." In other some embodiments, if a user is logged in as a "Preferred" customer, generator 203 may receive the following responses: "Good customer service," "Good return policy," and "Receive reward points."

Generator 203 may also retrieve a set of responses associated with the UI element code that generates Cancel Order button 504 from responses 300. For example, generator 203 may receive the following responses associated with the parameter data structure (e.g., "id=2") linked to the UI element code that generates Cancel Order button 504 from data source 104: "Too expensive," "Changed mind," "Better price elsewhere," and "Will not arrive in time."

In some embodiments, generator 203 may generate UI elements 603-1 and 603-2 instead of Place Order button 503 from the two responses "Good customer service" and "Good return policy." In other words, generator 203 may generate a UI element for each response. Similarly, generator 203 may generate UI elements 408-1, 408-2, 408-3, and 408-4 instead of Cancel Order button 404.

In some other embodiments, generator 203 may generate UI elements 603-1, 603-2, and 603-3 instead of Place Order button 503 from the three responses "Good customer service," "Good return policy," and "Receive reward policy" if a user is logged in as a "Preferred" customer. Specifically, generator 203 may retrieve the set of responses based on a context variable that stores information representing whether a user is logged in as a "Preferred" customer.

In some embodiments, generator 203 may generate UI elements 603-1, 603-2, and 603-3 such that they perform the same action as Place Order button 503. Generator 203 may also configure UI elements 603-1, 603-2, and 603-3 to capture their associated response when their UI action is performed.

Similarly, generator 203 may generate UI elements 604-1, 604-2, 604-3, and 604-4 such that they perform the same action as Cancel Order button 504. Generator 203 may also configure UI elements 604-1, 604-2, 604-3, and 604-4 to capture their associated response when their UI action is performed.

Figure 7:
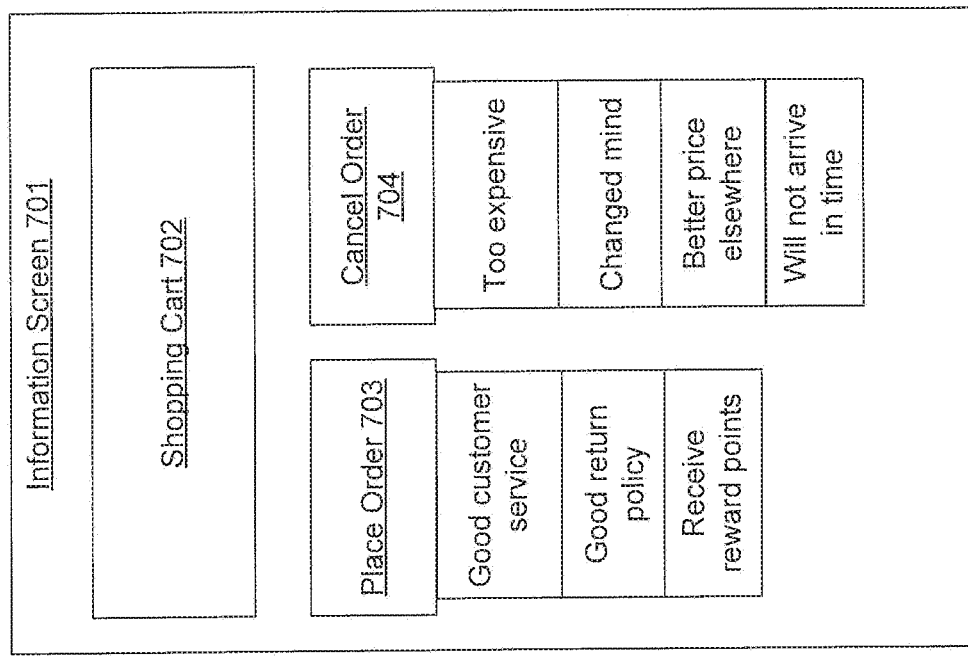
FIG. 7 is another example display of the information screen for an online shopping cart application with processing to capture user feedback based on one or more parameters, according to some embodiments.

FIG. 7 is another example display of the information screen for the online shopping cart application represented by UI markup 400 after processing to capture user feedback based on one or more parameters, according to some embodiments. In FIG. 7, viewer application 107 may display an information screen 701 after processing by generator 203. In some embodiments, information screen 701 may be a web page. In some other embodiments, information screen 701 may a UI screen for a desktop, laptop, tablet, smartphone, or smart device software application. In some other embodiments, information screen 701 may a UI screen for a POS terminal. In some embodiments, information screen 701 may include a shopping cart 702 similar to shopping cart 602 in information screen 601.

In some embodiments, generator 203 may generate UI elements 703 and 704 based on responses 300 for information screen 701. UI element 703 may capture the same responses as UI elements 603 in information screen 601. Similarly, UI element 704 may capture the same responses as UI elements 604 in information screen 601. However, generator 203 may generate drop down menus for UI elements 703 and 704 instead of the set of buttons for UI elements 603 and 604. In some embodiments, generator 203 may generate drop down menus for UI elements 703 and 704 based on a UI element type field of a parameter data structure linked to the UI element codes used to generate UI elements 703 and 704. For example, generator 203 may generate a drop down menu when the UI element type field is set to 'button type="menu"' in an HTML button tag, e.g., <button id="1" button_type="menu">Click me</button>. In some other embodiments, generator 203 may generate a hyperlink for UI element 703 that expands on a cursor hover to show the same responses as UI elements 603 in information screen 601. Similarly, generator 203 may generate a hyperlink for UI element 704 that expands on a cursor hover to show the same responses as UI elements 604 in information screen 601. In some other embodiments, a response in UI elements 703 and 704 may be selected by clicking a given response in the expanded list.

Figure 8:
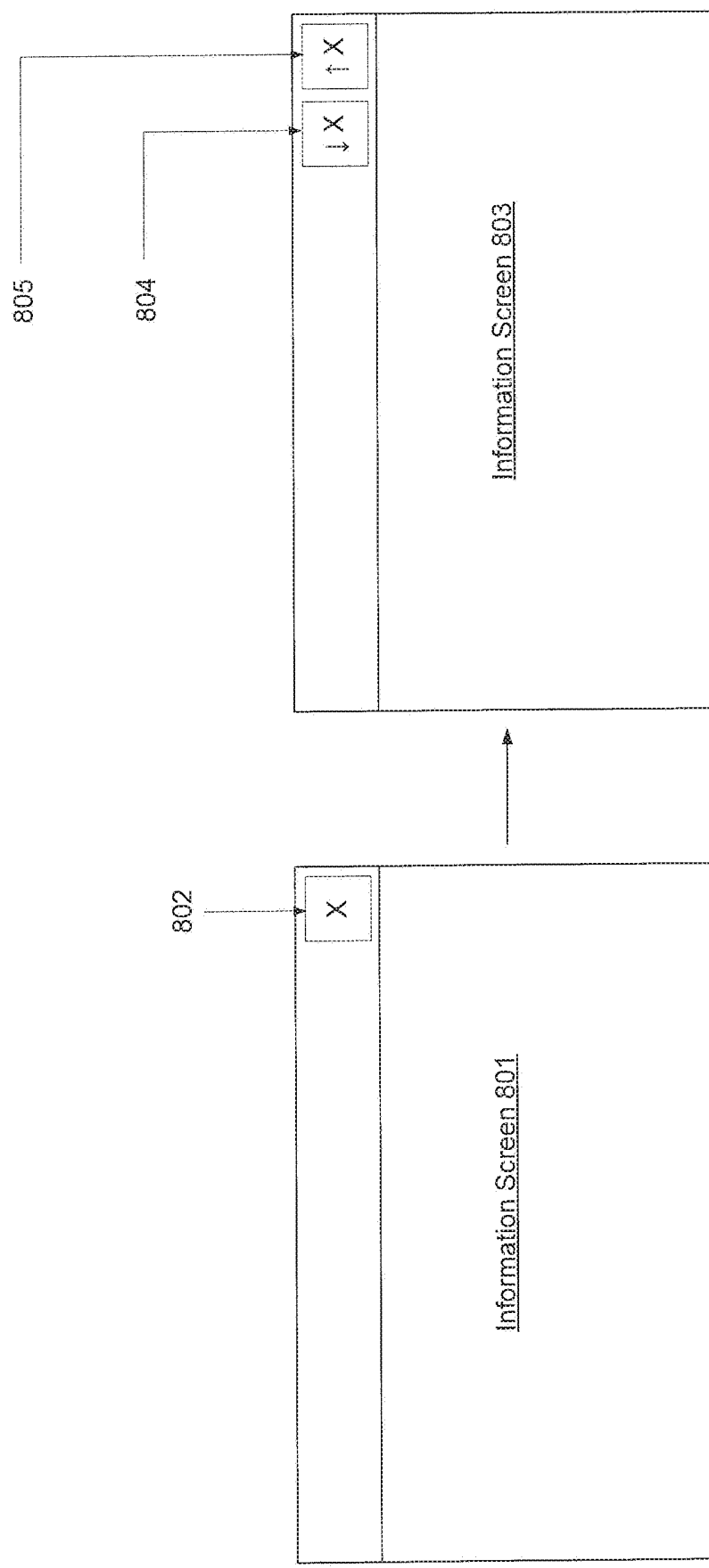
FIG. 8 is an example display of an information screen for an application with, and without, processing of the application frame window to capture user feedback based on one or more parameters, according to some embodiments.

FIG. 8 shows another example display of an information screen for an application without processing, and after processing of the application frame window to capture user feedback based on one or more parameters, according to some embodiments. In FIG. 8, viewer application 107 may display an information screen 801 without processing by generator 203. In some embodiments, information screen 801 may include the chrome or application window frame of a software application. In some embodiments, information screen 801 may include a UI element 802 in the chrome or application window frame to exit the software application.

In FIG. 8, viewer application 107 may display an information screen 803 after processing by generator 203. Information screen 803 may be the chrome or application frame of a software application similar to information screen 801. Information screen 803 may include two new UI elements 804 and 805 in the chrome or application window frame to exit the software application. In some embodiments, generator 203 may generate UI elements 804 and 805 such that both perform the same action (e.g., exiting the software application) as UI element 802, but also respectively capture two types of user feedback: for example, exit application because user dislikes the content in the information screen 803 and exit application but user likes the content in the information screen 803. In some embodiments, generator 203 may configure UI elements 804 and 805 to capture these two types of user feedback by including symbols in lieu of text, e.g., a down arrow and an up arrow in UI elements 804 and 805, respectively. Generator 203 may further configure UI elements 804 and 805 to capture the dislike and like responses, respectively.

Figure 9:
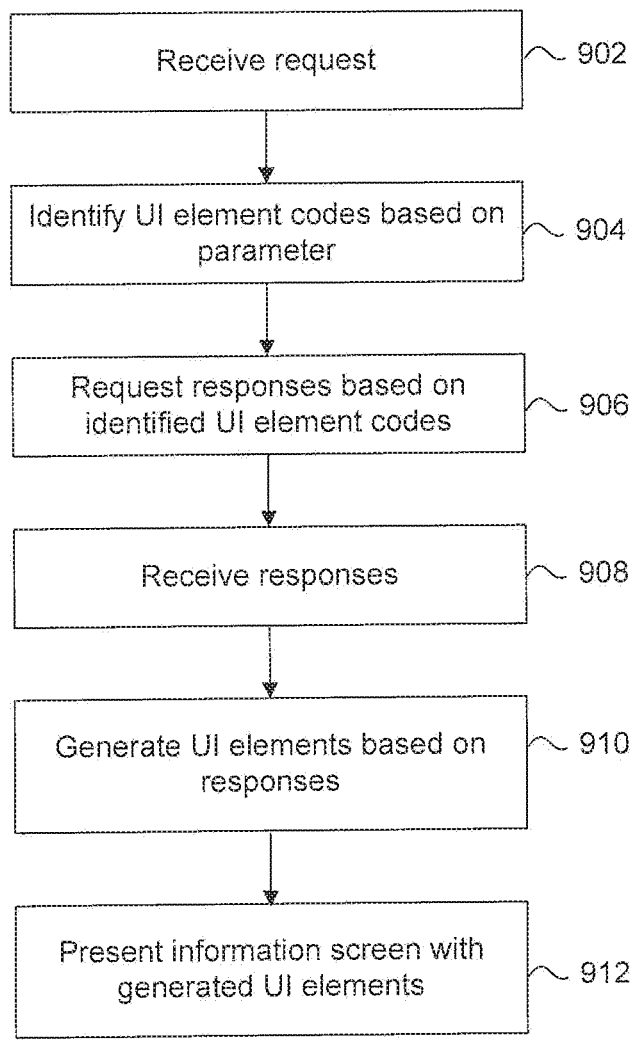
FIG. 9 is a flowchart illustrating a process for processing a UI to capture user feedback based on one or more parameters, according to some embodiments.

FIG. 9 is a flowchart for a method 900 for processing a UI code to capture user feedback based on one or more parameters, according to an embodiment. Method 900 can be performed by processing logic that can comprise hardware (e.g., circuitry, dedicated logic, programmable logic, microcode, etc.), software (e.g., instructions executing on a processing device), or a combination thereof.

In 902, UI adaptor 108 receives a request for an information screen for application 103 from a client device 106.

In 904, UI adaptor 108 identifies one or more UI element codes in a UI code for the information screen for which to generate UI elements. In some embodiments, UI adaptor 109 may identify the one or more UI element codes by locating in the UI code one or more parameter data structures linked to the one or more UI element codes. In some embodiments, a parameter data structure may be a unique numerical identifier. In some other embodiments, a parameter data structure may be a compound data structure including several fields. In some embodiments, an agent may link a parameter data structure to a UI element code by modifying a markup file describing an information screen for the application. For example, an agent may modify a UI element code by including a unique numerical identifier representing a parameter data structure in an HTML tag associated with the UI element, e.g., <button id="1"type="button">Click me</button> where "id" is the parameter data structure that stores the unique numerical identifier.

In 906, UI adaptor 108 requests a set of responses for each identified UI element code from data source 104. In some embodiments, UI adaptor 108 may request a set of responses for an identified UI element code based on a parameter data structure linked to the identified UI element. In some embodiments, UI adaptor 108 may request the set of responses for the identified UI element code based on a category associated with the identified UI element code. In some embodiments, UI adaptor 108 may request the set of responses for the identified UI element code based on information in a context variable.

In some embodiments, UI adaptor 108 may request the set of responses for each identified UI element code in turn based on the parameter data structure linked to the identified UI element. In some other embodiments, UI adaptor 108 may request the set of responses for all identified UI element codes at once (e.g., via a single request) based on the parameter data structures linked to the identified UI elements.

In some embodiments, a context variable may be a data structure that stores state information (e.g., items added to a shopping cart in an online store) or records user activity (e.g., clicking of particular buttons, logging in, or recording which information screen of the application was viewed by a user in the past). In some embodiments, a context variable may be stored on client device 106 (e.g., a cookie for a web browser). In some other embodiments, a context variable may be stored on server 102.

In 908, UI adaptor 108 receives a set of responses for each identified UI element code from data source 104.

In 910, UI adaptor 108 generates one or more UI elements for each identified UI element code based on the set of responses received in 908. In some embodiments, UI adaptor 108 generates a UI element for each response in the set of responses received in 908. UI adaptor 108 may determine the type of UI element to generate based on a UI element type field in the parameter data structure linked to the identified UI element code.

In some embodiments, UI adaptor 108 may configure the one or more new UI elements to perform the same action as the corresponding identified UI element code. In some embodiments, UI adaptor 108 may configure the one or more new UI elements to capture their associated response. As would be appreciated by a person of ordinary skill in the art, UI adaptor 108 may configure a UI element to capture a response using various other mechanisms (e.g., a HTTP GET request, a HTTP POST request, JavaScript, Java. and PHP). A captured response may be stored in server 102 or data store 104.

In 912, UI adaptor 108 presents the information screen for application 103 on client device 106 using viewer application 107. In some embodiments, if UI adaptor 108 is located in server 102, UI adaptor 108 may transmit the information screen for application 103 to client device 106 for presentation by viewer application 107.

In some embodiments, UI adaptor 108 may request, generate, and configure the one or more UI elements at the time the information screen is loaded. In some other embodiments, UI adaptor 108 may perform one or more of the requesting, generating, and configuring of the one or more UI elements based on a user interaction with an already loaded information screen (e.g. tapping a UI element in the loaded information screen with an associated parameter data structure causes UI adaptor 108 to request, generate, and configure the one or more UI elements).

Figure 10:
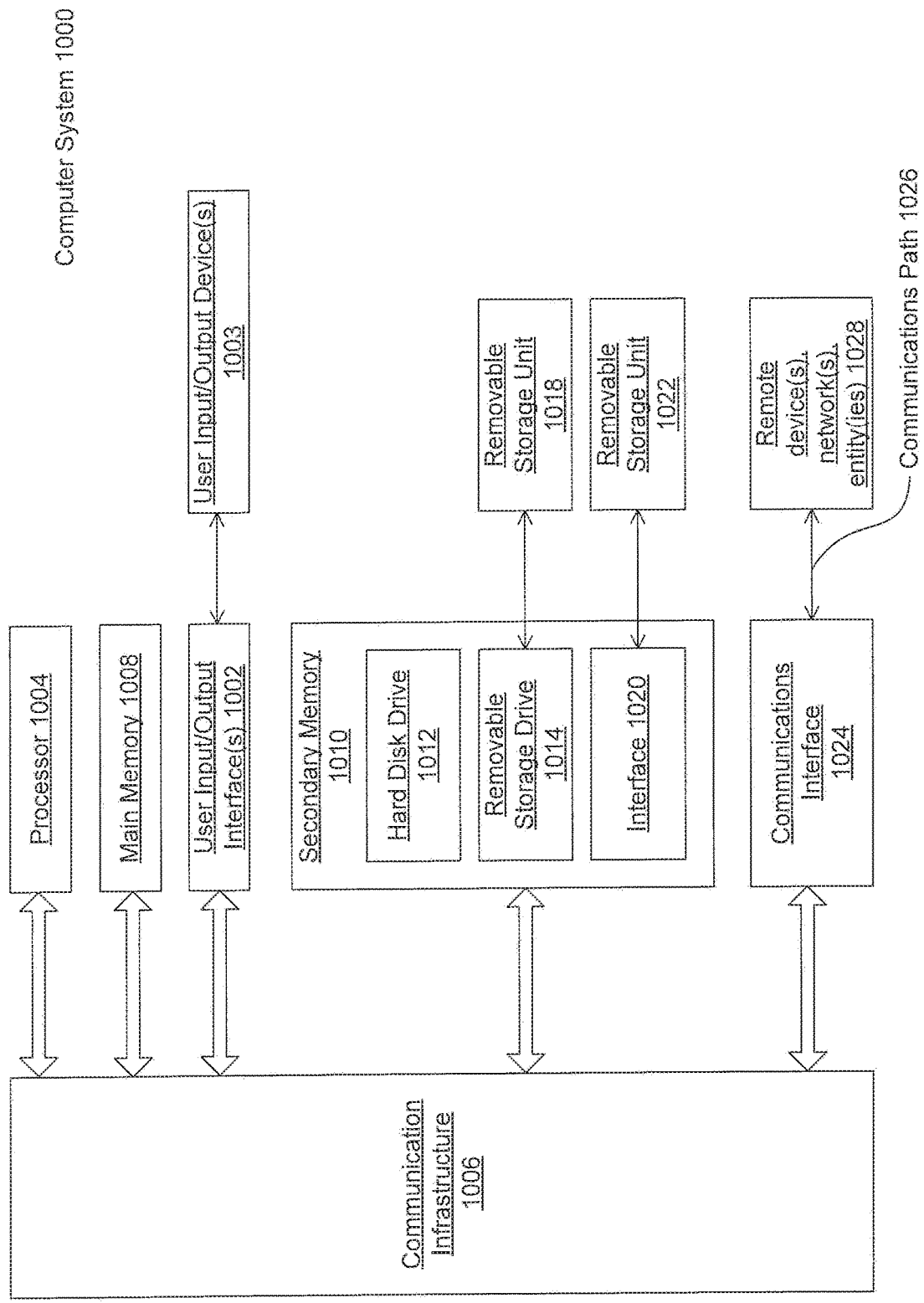
FIG. 10 is an example computer system useful for implementing various embodiments.

Various embodiments can be implemented, for example, using one or more computer systems, such as computer system 1000 shown in FIG. 10. Computer system 1000 can be used, for example, to implement method 900 of FIG. 9. For example, computer system 900 can identify UI elements in an information screen based on a parameter data structure. Computer system 900 can further generate a new set of UI elements based on the identified UI elements, according to some embodiments. Computer system 1000 can be any computer capable of performing the functions described herein.

Computer system 1000 can be any well-known computer capable of performing the functions described herein.

Computer system 1000 includes one or more processors (also called central processing units, or CPUs), such as a processor 1004. Processor 1004 is connected to a communication infrastructure or bus 1006.

One or more processors 1004 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure 1006 through user input/output interface(s) 1002.

Computer system 1000 also includes a main or primary memory 1008, such as random access memory (RAM). Main memory 1008 may include one or more levels of cache. Main memory 1008 has stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to an example embodiment, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

In an embodiment, a tangible apparatus or article of manufacture comprising a tangible computer useable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 10. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all example embodiments of the invention as contemplated by the inventor(s), and thus, are not intended to limit the invention or the appended claims in any way.

While the invention has been described herein with reference to example embodiments for example fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment." "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described example embodiments, but should be defined only in accordance with the following claims and their equivalents.

What is claimed is:

1. A computer implemented method for processing a user interface to capture user feedback, comprising:
    identifying, by at least one processor, a user interface (UI) element code for an information screen based at least in part on a first parameter data structure linked to the UI element code, wherein the UI element code is configured to perform a first action;
    requesting, by the at least one processor, a first set of responses from a database based at least in part on the first parameter data structure;
    transforming, by the at least one processor, the UI element code into a set of UI elements based at least in part on the first set of responses, wherein each UI element in the set of UI elements is configured to perform the first action and a second action comprising capturing a response in the first set of responses; and
    presenting, by the at least one processor, the information screen with the set of UI elements.

2. The method of claim 1, wherein the transforming further comprises:
    transforming, by the at least one processor, the UI element code into the set of UI elements based at least in part on a UI element type field of the first parameter data structure, wherein each UI element in the set of UI elements is a type of UI element specified by the UI element type field.

3. The method of claim 1, further comprising:
    requesting, by the at least one processor, a second set of responses from the database based at least in part on a second parameter data structure linked to the UI element code.

4. The method of claim 3, wherein the requesting the second set of responses further comprises:
    requesting, by the at least one processor, the second set of responses from the database based at least in part on a category or a context variable, wherein the category is associated with the UI element code.

5. The method of claim 3, further comprising:
combining, by the at least one processor, the first set of responses with the second set of responses.

6. The method of claim 5, wherein the combining further comprises:
combining, by the at least one processor, the first set of responses with the second set of responses based at least in part on an intersection of the first set of responses and the second set of responses.

7. The method of claim 5, wherein the combining further comprises:
combining, by the at least one processor, the first set of responses with the second set of responses based at least in part on a union of the first set of responses and the second set of responses.

8. A system, comprising:
a memory; and
at least one processor coupled to the memory and configured to:
identify a user interface (UI) element code for an information screen based at least in part on a first parameter data structure linked to the UI element code, wherein the UI element code is configured to perform a first action;
request a first set of responses from a database based at least in part on the first parameter data structure;
transform the UI element code into a set of UI elements based at least in part on the first set of responses, wherein each UI element in the set of UI elements is configured to perform the first action and a second action comprising capturing a response in the first set of responses; and
present the information screen with the set of UI elements.

9. The system of claim 8, wherein to transform, the at least one processor is further configured to:
transform the UI element code into the set of UI elements based at least in part on a UI element type field of the first parameter data structure, wherein each UI element in the set of UI elements is a type of UI element specified by the UI element type field.

10. The system of claim 8, wherein the at least one processor is further configured to:
request a second set of responses from the database based at least in part on a second parameter data structure linked to the UI element code.

11. The system of claim 10, wherein to request the second set of responses, the at least one processor is further configured to:
request the second set of responses from the database based at least in part on a category or a context variable, wherein the category is associated with the UI element code.

12. The system of claim 10, wherein the at least one processor is further configured to:
combine the first set of responses with the second set of responses.

13. The system of claim 12, wherein to combine the first set of responses with the second set of responses, the at least one processor is further configured to:
combine the first set of responses with the second set of responses based at least in part on an intersection of the first set of responses and the second set of responses.

14. The system of claim 12, wherein to combine the first set of responses with the second set of responses, the at least one processor is further configured to:
combine the first set of responses with the second set of responses based at least in part on a union of the first set of responses and the second set of responses.

15. A user interface for simultaneously capturing data input and performing an action instantiated on a display of an electronic device, wherein the user interface is generated by a process comprising the steps of:
identifying, by at least one processor, a user interface (UI) element code based at least in part on a first parameter data structure, wherein the UI element code is configured to perform a first action;
requesting, by the at least one processor, a first set of responses from a database based at least in part on the first parameter data structure; and
transforming, by the at least one processor, the UI element code into a set of UI elements based at least in part on the first set of responses, wherein each UI element in the set of UI elements is configured to perform the first action and a second action comprising capturing a response in the first set of responses.

16. The user interface of claim 15, wherein the transforming further comprises:
transforming, by the at least one processor, the UI element code into the set of UI elements based at least in part on a UI element type field of the first parameter data structure, wherein each UI element in the set of UI elements is a type of UI element specified by the UI element type field.

17. The user interface of claim 15, wherein the process further comprises the step of:
requesting, by the at least one processor, a second set of responses from the database based at least in part on a second parameter data structure linked to the UI element code.

18. The user interface of claim 17, wherein the process further comprises the step of:
combining, by the at least one processor, the first set of responses with the second set of responses.

19. The user interface of claim 18, wherein the combining further comprises:
combining, by the at least one processor, the first set of responses with the second set of responses based at least in part on an intersection of the first set of responses and the second set of responses.

20. The user interface of claim 18, wherein the combining further comprises:
combining, by the at least one processor, the first set of responses with the second set of responses based at least in part on a union of the first set of responses and the second set of responses.

* * * * *